US012020832B2

(12) United States Patent
Lynch

(10) Patent No.: US 12,020,832 B2
(45) Date of Patent: Jun. 25, 2024

(54) HIGH VOLTAGE CONDUCTOR COVER WITH SEPARATE OUTER SHELL FOR INSULATORS WITH METAL TOPS

(71) Applicant: Eco Electrical Systems, Reno, NV (US)

(72) Inventor: Michael Lynch, Reno, NV (US)

(73) Assignee: Eco Electrical Systems Inc., Reno, NV (US)

( * ) Notice: Subject to any disclaimer, the term of this patent is extended or adjusted under 35 U.S.C. 154(b) by 109 days.

(21) Appl. No.: 17/191,418

(22) Filed: Mar. 3, 2021

(65) Prior Publication Data

US 2022/0285055 A1 Sep. 8, 2022

(51) Int. Cl.
*H01B 17/38* (2006.01)
*H01B 17/14* (2006.01)

(52) U.S. Cl.
CPC ............. *H01B 17/38* (2013.01); *H01B 17/14* (2013.01)

(58) Field of Classification Search
CPC ................................ H01B 17/14; H01B 17/38
See application file for complete search history.

(56) References Cited

U.S. PATENT DOCUMENTS 7,154,036 B2 * 12/2006 Lynch ...................... H02G 7/00 174/138 F
7,839,256 B2 * 11/2010 Bradford ................ H01B 17/00 337/186
8,618,412 B2 * 12/2013 Lynch .................... H01B 17/00 119/713
8,772,633 B2 * 7/2014 Behnken ................ H01B 19/00 174/138 R
8,957,314 B2 * 2/2015 Niles ........................ H02G 7/00 174/172
10,881,097 B2 * 1/2021 Lynch .................... H01B 17/56
10,958,046 B2 * 3/2021 Lynch ...................... H02B 1/06
2006/0003622 A1 * 1/2006 Lynch ...................... H02G 7/00 439/404
2008/0128163 A1 * 6/2008 Bradford .............. H01H 31/127 174/5 R
2010/0218988 A1 * 9/2010 Lynch ...................... H02G 7/00 174/5 R
2013/0299230 A1 * 11/2013 Lynch .................... H01B 17/00 174/5 R
2015/0114678 A1 * 4/2015 Lynch ...................... H02G 7/00 29/887

* cited by examiner

*Primary Examiner* — William H. Mayo, III
*Assistant Examiner* — Rhadames Alonzo Miller
(74) *Attorney, Agent, or Firm* — Patent Law Group; Brian Ogonowsky

(57) ABSTRACT

A dielectric cover for a first type of insulator, supporting a conductor in an electrical distribution system, has a first height for covering high voltage portions of the first type of insulator. Thus, wildlife is protected from electrocution. In the event a second type of insulator is used, such as a K-Line type insulator having a relatively large top metal, an inexpensive dielectric shell is fitted over top of the cover to extend the dielectric height by at least one inch to fully laterally cover the top metal of the of the K-Line type insulator. Thus, different covers are not needed for covering both types of insulators, since only the shell is added for covering the second type of insulator. The shell may be provided in different sizes to accommodate different lengths of the top metal. Retaining pins are used to secure the cover over the insulator and conductor.

9 Claims, 4 Drawing Sheets

HIGH VOLTAGE CONDUCTOR COVER WITH SEPARATE OUTER SHELL FOR INSULATORS WITH METAL TOPS

FIELD OF THE INVENTION

This invention relates to a dielectric cover for high voltage power line insulators and conductors (wires) and, in particular, to an insulator cover system that has a separate shell for certain types of insulators having a metal end. The shell is not used for standard insulators.

BACKGROUND

A wood or metal utility pole is typically used for supporting high voltage (HV) conductors (e.g., twisted wire strands) in a power distribution system. Each pole has secured to it one or more crossarms that support insulators which, in turn, support the HV conductors. The insulators are typically ceramic or a polymer. A conductor is typically secured over the top of each insulator, or along its side, via a metal tie wire, a bracket, a clamp, or other means.

FIG. 1 is a perspective view of a top portion of a crossarm 10 of a utility pole. An insulator 12 is affixed to the crossarm 10 with a bolt 14. A generally horizontal conductor 16 seats in a top groove in the insulator 12 or along the neck area 18. There are many different designs of such insulators, and FIG. 1 shows a conventional design. A common feature of such insulators is a narrow neck area 18 and a wider skirt 20.

One known problem with exposed insulators and conductors is that large birds or other wildlife may alight on the grounded crossarm and short out phases or short a conductor to ground. Insulating (e.g., plastic) covers that cover the insulator 12 and a portion of the conductor 16 extending from the insulator 12 are known.

FIG. 2 is taken from the Applicant's U.S. application Ser. No. 16/779,169, incorporated herein by reference. FIG. 2 is a side view of a dielectric cover 24, such as a molded plastic, covering the insulator 12 of FIG. 1 and a portion of the conductor 16 for protecting wildlife and preventing outages from wildlife. The cover 24 comprises an insulator cover 26 and two identical attachable arms 28 and 30.

Holes 32 extend through the cover 24 and arms 28/30 and below the conductor 16. Retaining pins, described later, are inserted through the holes 32 and pass through corresponding holes on the opposite side under the conductor 16, which secures the cover 24 in place. The pins and the cover 24 may be manipulated by a hot stick while high voltage is conducted by the conductor 16 so there is no loss of power to the consumer when the cover 24 is installed.

The bottom of the insulator cover 26 rests on the wide skirt 20 of the insulator 12, or the top of the insulator abuts against the ceiling of the insulator cover 26, depending on the type of insulator used.

FIG. 3 illustrates one special type of insulator 36 manufactured by K-Line Insulators Limited (K-Line™). The insulator 36 is available in various forms depending on the voltage and use. The lengths L vary between about 1-2 feet. The insulator 36 has a robust metal base 38 that is bolted to a base, a porcelain or polymer insulator 40, and a metal top 42. The metal top 42 may include a clamp for a wire. The metal top 42 provides a robust support for the wire. In order to protect wildlife, the entire high voltage metal top 42 must be covered by a suitable dielectric cover. The metal top 42 may be on the order of 3-6 inches in length.

FIG. 4 illustrates Applicant's new design of an insulator cover 46 with attachable arms 48 and 50. The cover 46 is intended to cover the high voltage portion of the insulator, and the arms 48/50 cover the wire over a few feet from the insulator so birds roosting on a crossarm cannot contact the high voltage wire. The cover 46 is suitable for conventional insulators that do not have the large metal top of the K-Line type insulator 36. FIG. 4 shows the cover 46 installed over the K-Line insulator 36, with the high voltage metal top 42 undesirably exposed. So Applicant's cover 46, by itself, is not suitable for the K-Line insulator 36. For example, Applicant's cover 46 may have a depth of 4-5 inches (which accommodates the thickness of the wire), but the metal top 42 of the K-Line insulator 36 extends down below the cover 46, so at least one inch of the metal top 42 is exposed.

What is needed is a dielectric cover for an insulator supporting a high voltage conductor, where the same cover can be used for standard insulators and for K-Line type insulators with a metal top.

SUMMARY

Applicant manufactures an insulator cover designed for standard insulators. The standard insulator supports a high voltage conductor and has either no metal on top or a relatively small metal connector/support on top that contacts the wire. Occasionally, a utility company uses a K-Line type insulator having a relatively large metal top that extends down by, for example, 2-6 inches. The size depends on the voltage and the purpose of the insulator. Such a large metal top extends below Applicant's insulator cover by at least one inch, thus exposing wildlife to the high voltage.

Rather than Applicant manufacturing a specially designed insulator cover for the K-Line insulator, Applicant has designed an inexpensive dielectric shell that fits over Applicant's existing insulator cover. The shell effectively extends the cover downward by about two inches to completely cover the metal top of the K-Line insulator. In one embodiment, the bottom of the shell rests on the top rib of the K-Line insulator so lateral coverage of the metal top is assured.

The shell securely connects to the existing cover and may be connected by a lineman in the field or in a factory as required. Accordingly, inventory requirements are greatly eased since the same insulator cover can be used with standard insulators as well as a K-Line insulator. Only the inexpensive shell needs to augment the existing insulator cover.

The K-Line insulator may simply support a high voltage conductor or may be a bushing, where a conductor through the middle of the insulator connects between a top connector and a bottom connector.

Although the term K-Line has been used to describe the type of insulator with a large metal top, other insulators not manufactured by K-Line may also use large metal tops, and Applicant's cover and shell can fully cover such large metal tops. Different shells may be provided for different types of insulators, potentially extending the effective depth of the cover by four or more inches.

The cover includes attachable dielectric arms to cover the wire extending from the insulator. The coverage is sufficient to prevent birds from directly contacting exposed wires when spreading their wings while perched on the utility pole.

The cover and arms are secured over the insulator and wire by retaining pins that extend through holes in the cover and under the wire. The shell for the K-Line type insulator may be affixed to the cover by plastic bolts or other connectors. Thus, the cover and shell cannot be blown off the insulator in high winds. The pins may be easily removed by a lineman using a hot stick.

Other features of the cover system are also described.

BRIEF DESCRIPTION OF THE DRAWINGS

In FIG. 5, the bottom of the shell rests on the top rib of the polymer insulator to insure the metal top is fully covered to prevent wildlife from contacting the metal top.

Elements labeled with the same numerals in the various figures may be identical or similar.

DETAILED DESCRIPTION

Figure 3:
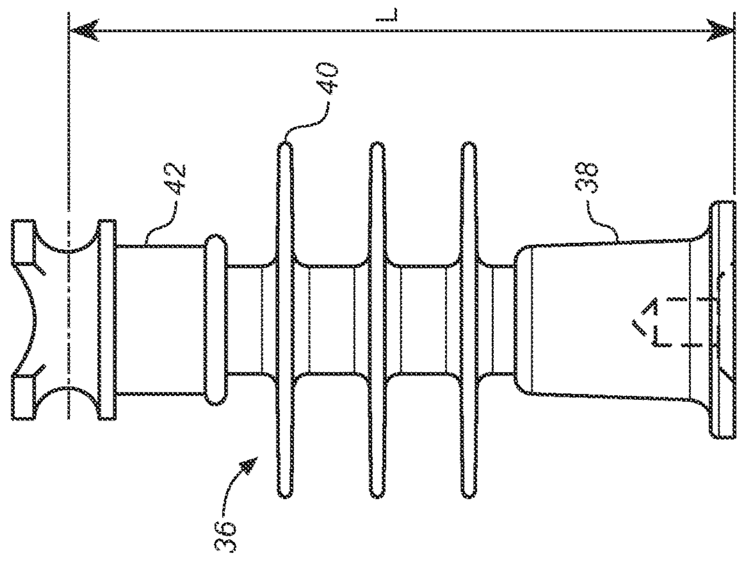
FIG. 3 (PRIOR ART)
FIG. 3 is a side view of one type of K-Line type insulator with a metal top for supporting a HV conductor. A metal tie may secure the wire to the metal top for supporting the conductor. Other K-Line insulators are much longer and include a metal clamp for the wire. The 2020 K-Line catalog, available on-line, is incorporated herein by reference.
Figure 1:
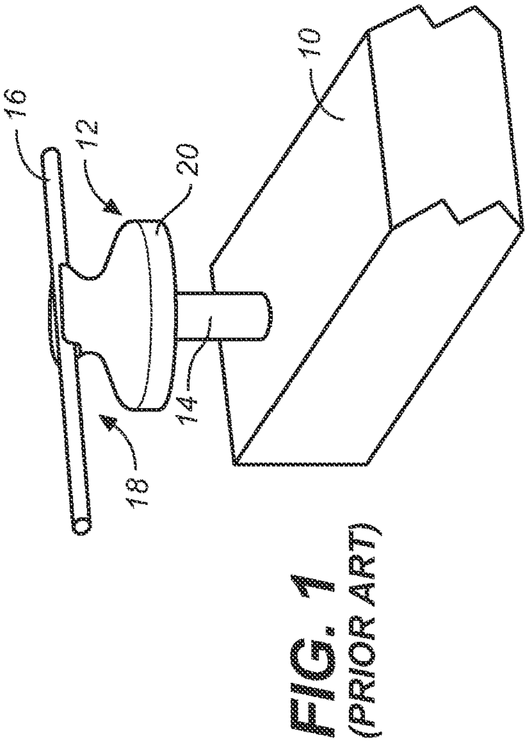
FIG. 1 (PRIOR ART)
FIG. 1 is a perspective view of a crossarm of a utility pole supporting a conventional insulator and HV conductor. There is no metal connector on the insulator.
Figure 2:
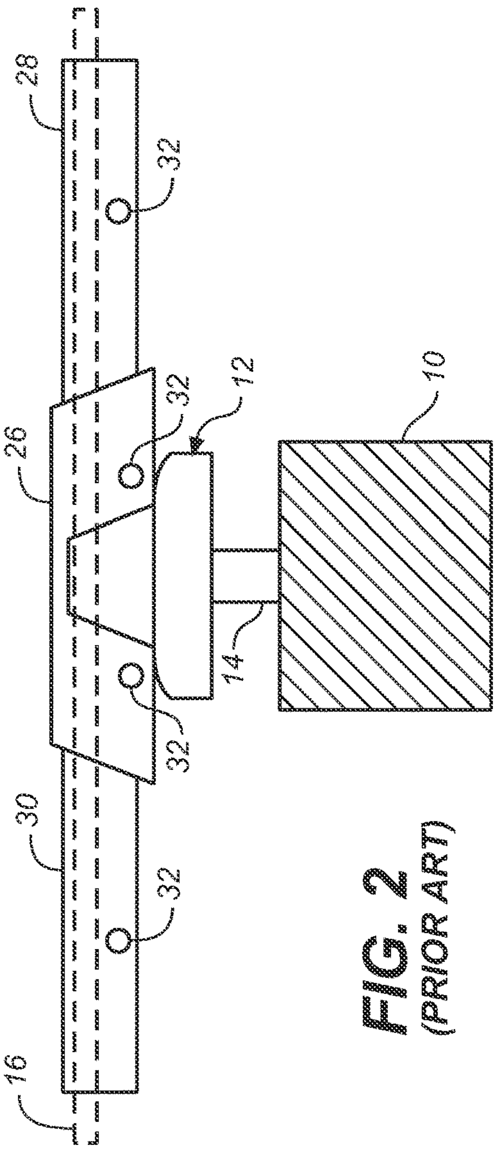
FIG. 2 (PRIOR ART)
FIG. 2 is a side view of a conventional dielectric cover covering the insulator of FIG. 1 and a portion of the conductor for preventing outages from wildlife.
Figure 5:
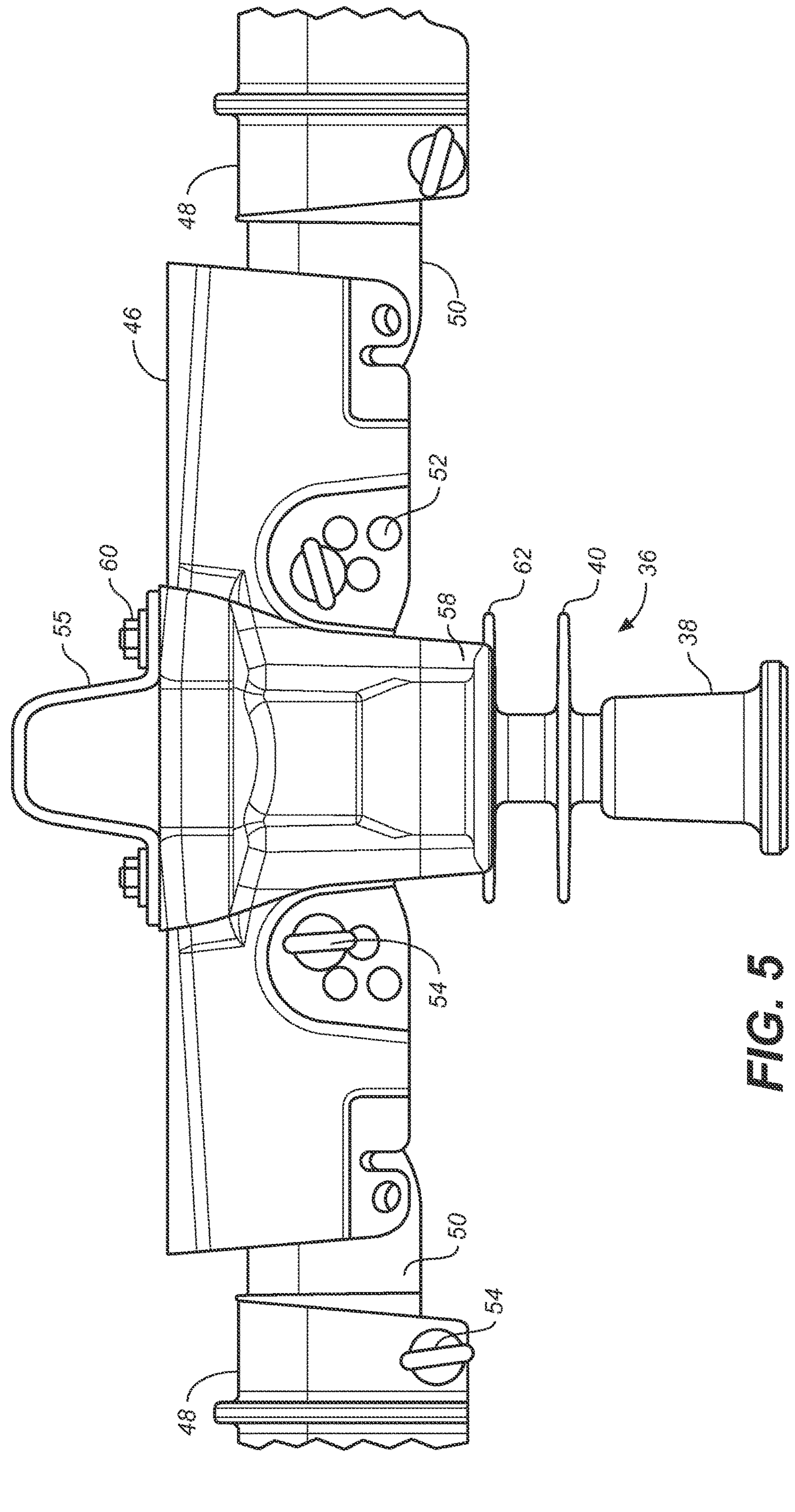
FIG. 5 is a side view of the Applicant's new cover of FIG. 4 along with a shell that fits over the cover to effectively extend the depth of the cover by, for example, one or more inches to laterally cover the metal top of the insulator.

FIG. 5 is a side view of Applicant's dielectric cover 46, such as a molded plastic, covering the K-Line type insulator 36 of FIG. 3 or any other type of K-Line insulator having a metal top. The metal top has a recessed portion for supporting a HV wire and may also include a metal clamp for the wire. The cover 46 also covers a conductor (e.g., conductor 16 in FIG. 1) extending from the insulator 36 for protecting wildlife and preventing outages from wildlife. FIG. 5 also shows two identical attachable arms 48 and and two arm adapters 50.

Holes 52 extend through the cover 46 and below the conductor. Identical retaining pins 54 are inserted through the holes 52 and pass through corresponding holes on the opposite side under the conductor, which secures the cover 46 and arms 48 in place. The pins 54 and the cover 46 may be manipulated by a hot stick while high voltage is conducted by the conductor so there is no loss of power to the consumer when the cover 46 is installed. The hot stick has a hook that engages holes in the cover 46, or the top handle 55, and a ring in the pins 54. More detail of the pins is described in Applicant's U.S. Pat. No. 10,679,815, incorporated herein by reference, describing a dielectric cutout cover held in place using dielectric retaining pins.

Figure 4:
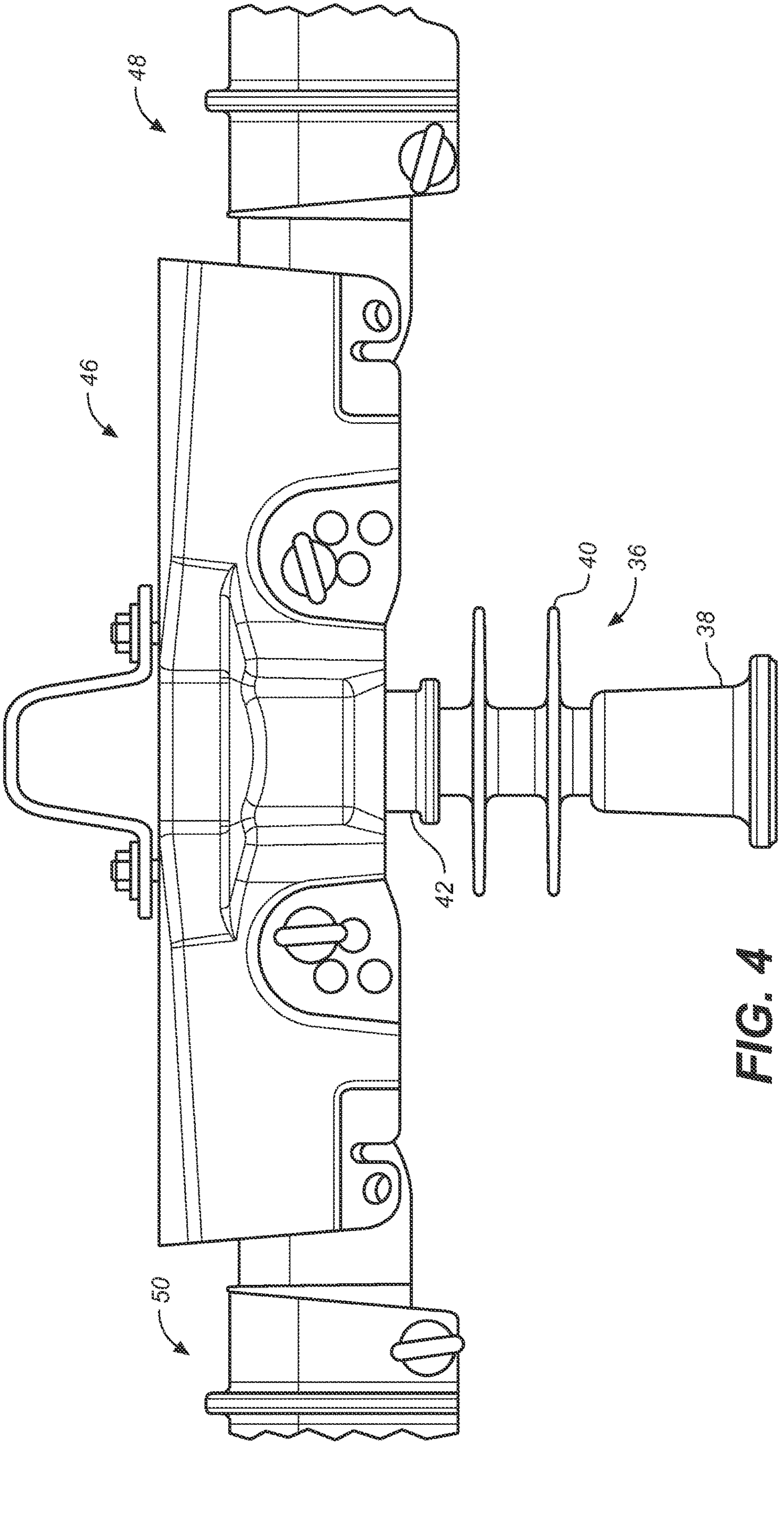
FIG. 4 is a side view of Applicant's new insulator cover, which is designed to cover conventional insulators not having a large metal top. The cover, however, is shown covering a K-Line type insulator, where a bottom portion of the metal top is laterally exposed, which will result in electrocution of a bird if the bird contacts the exposed metal. Also shown are optional attachable arms for the cover.

FIG. 5 differs from FIG. 4 in that a molded dielectric shell 58 is secured over the top of the cover 46, using plastic bolts 60. The inner surface of the shell 58 generally conforms to the outer surface of the cover 46 so does not add much lateral width. Importantly, the shell 58 is at least one inch higher than the cover 46 to effectively extend the cover 46 down one or more inches. The shell 58 may extend the cover 46 one to ten more inches, depending on the size of the metal top (42 in FIG. 4) of the insulator. The size of the metal top depends on the application of the insulator and the voltage requirements. For certain models of insulator, the metal top may be ten inches. Therefore, the required shell 58 must be relatively long to fully cover the metal top and rest on the top rib 62 of the insulator 40. If the shell 58 rests on the top rib 62 of the insulator 40, there is no gap to allow a bird's wing to touch the metal top.

The shell 58 may be provided in various sizes to accommodate insulators with varying metal top lengths.

Although the shell 58 and cover 46 are open near the bottom in the direction of the conductor (wire), birds would not come in contact with any high voltage metal exposed along that direction and below the cover 46.

Accordingly, the cover 46 is effectively supported by the top rib 62 of the insulator 40, and is prevented from being blown off by the retaining pins 54. Depending on the height of the cover 46 above the insulator 40, any suitable hole in the cover 46 may be used for the pins 54.

Figure 6:
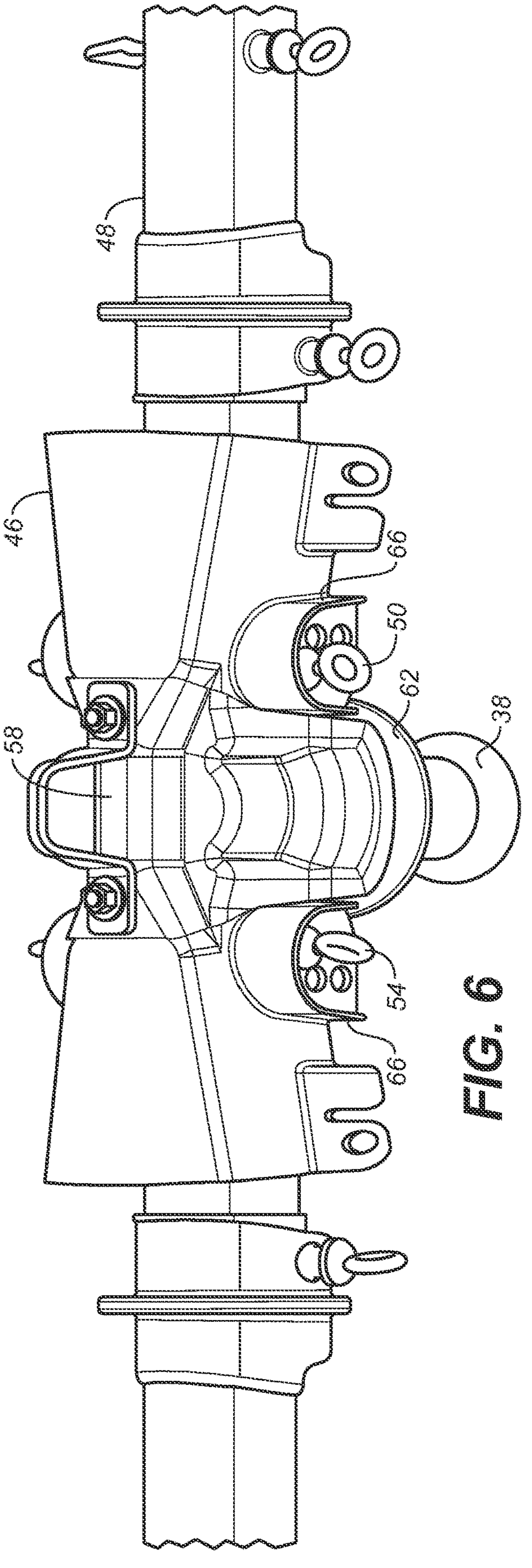
FIG. 6 is a top down perspective view of FIG. 5.

As seen in the perspective view of FIG. 6, the shell 58 is opened on two ends and its bottom, and conforms to the cover 46 on its two sides.

Rounded fenders 66 over the pin 54 areas act as arched roofs or shields. The fenders 66 extend out from the cover 46 by about one inch to shield the rings of the pins 54 and still allow the lineman to grasp the ring of the pins 54 by a hot stick. The fenders 66 have multiple purposes. The fenders 66 effectively prevent birds roosting on the pin 54 (whose shafts are directly below the HV conductor), increase the dielectric surface length between the top of the cover 46 and the electrical conductor above the pins 54, and protect the pins 54 from contamination issues which would reduce the dielectric properties of the pins 54. Contamination issues include birds defecating on the pins 54, which can create a conductive path between the bird and the inside of the cover 46, and atmospheric moisture such as rain, snow, and ice on the pins 54.

There are a variety of insulator shapes, and the insulator 36 is just an example. The insulator cover 46, arms 48, and shell 58 may be molded to accommodate any standard insulator shape and any K-Line type insulator shape while still retaining all aspects of the invention.

Having described the invention in detail, those skilled in the art will appreciate that, given the present disclosure, modifications may be made to the invention without departing from the spirit of the inventive concept described herein. Therefore, it is not intended that the scope of the invention be limited to the specific embodiments illustrated and described.

What is claimed is:

1. A dielectric cover for an insulator and conductor supported by the insulator, the conductor being for carrying a voltage, the insulator comprising a metal base, an insulating portion, and a top metal portion for supporting the conductor, such that the top metal portion is energized when the conductor is energized, the insulating portion being between the metal base and the top metal portion, the cover comprising:

a first cover portion configured to cover only a portion of the top metal portion of the insulator, the first cover portion having a first height, wherein the first cover portion, when placed over the top metal portion, does not fully laterally cover the top metal portion in a direction perpendicular to the conductor; and a second cover portion formed as a separate piece, the second cover portion fitting over the first cover portion and also configured to cover the top metal portion of the insulator, the second cover portion having a second height greater than the first height, such that the second cover portion extends below the first cover portion when fitted over the first cover portion such that the second cover portion, when placed over the first cover portion, fully laterally covers the top metal portion in the direction perpendicular to the conductor.

2. The cover of claim 1 wherein the second cover portion has inner dimensions that generally conform to outer dimensions of the first cover portion.

3. The cover of claim 1 wherein the first cover portion is configured to be used without the second cover portion for covering first types of insulators, and the first cover portion in conjunction with the second cover portion is configured to be used for covering second types of insulators.

4. The cover of claim 1 wherein the second cover portion is affixed to the first cover portion.

5. The cover of claim 1 further comprising holes in the first cover portion for receiving retaining pins that extend under the conductor.

6. The cover of claim 1 wherein the first cover portion has a bottom that rests on a top rib of first types of insulators, and the second cover portion has a bottom that rests on a top rib of second types of insulators.

7. The cover of claim 1 wherein the insulator includes one or more ribs.

8. The cover of claim 1 wherein the cover is secured over the insulator and conductor in an electrical distribution system.

9. The cover of claim 1 wherein the second height is at least one inch more than the first height.

* * * * *